Patented July 15, 1941

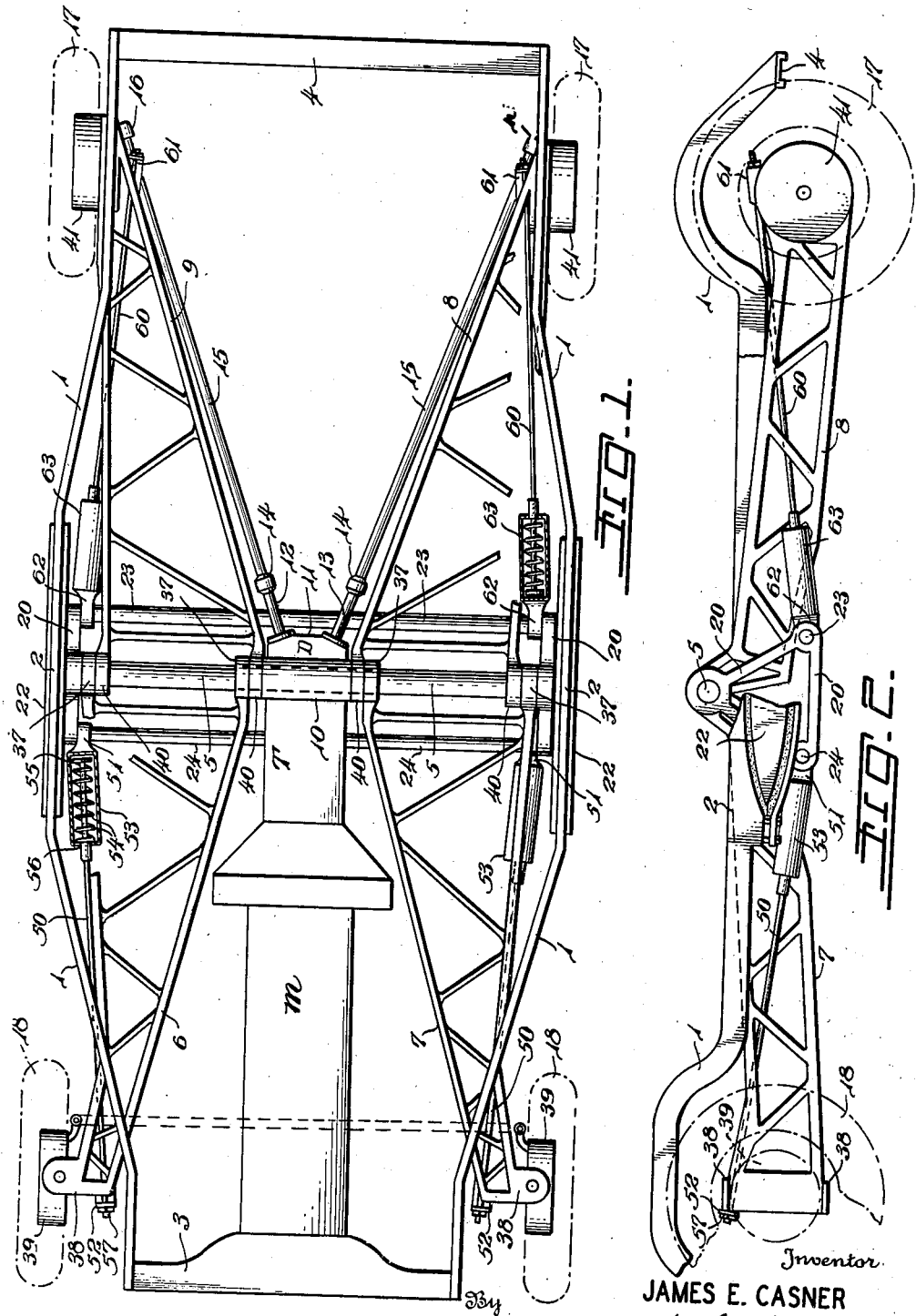
July 15, 1941.  J. E. CASNER  2,248,921
AUTOMOBILE CHASSIS
Filed Sept. 25, 1939  3 Sheets-Sheet 1
Inventor
JAMES E. CASNER
H. G. Lombard
Attorney July 15, 1941.  J. E. CASNER  2,248,921
AUTOMOBILE CHASSIS
Filed Sept. 25, 1939  3 Sheets-Sheet 2
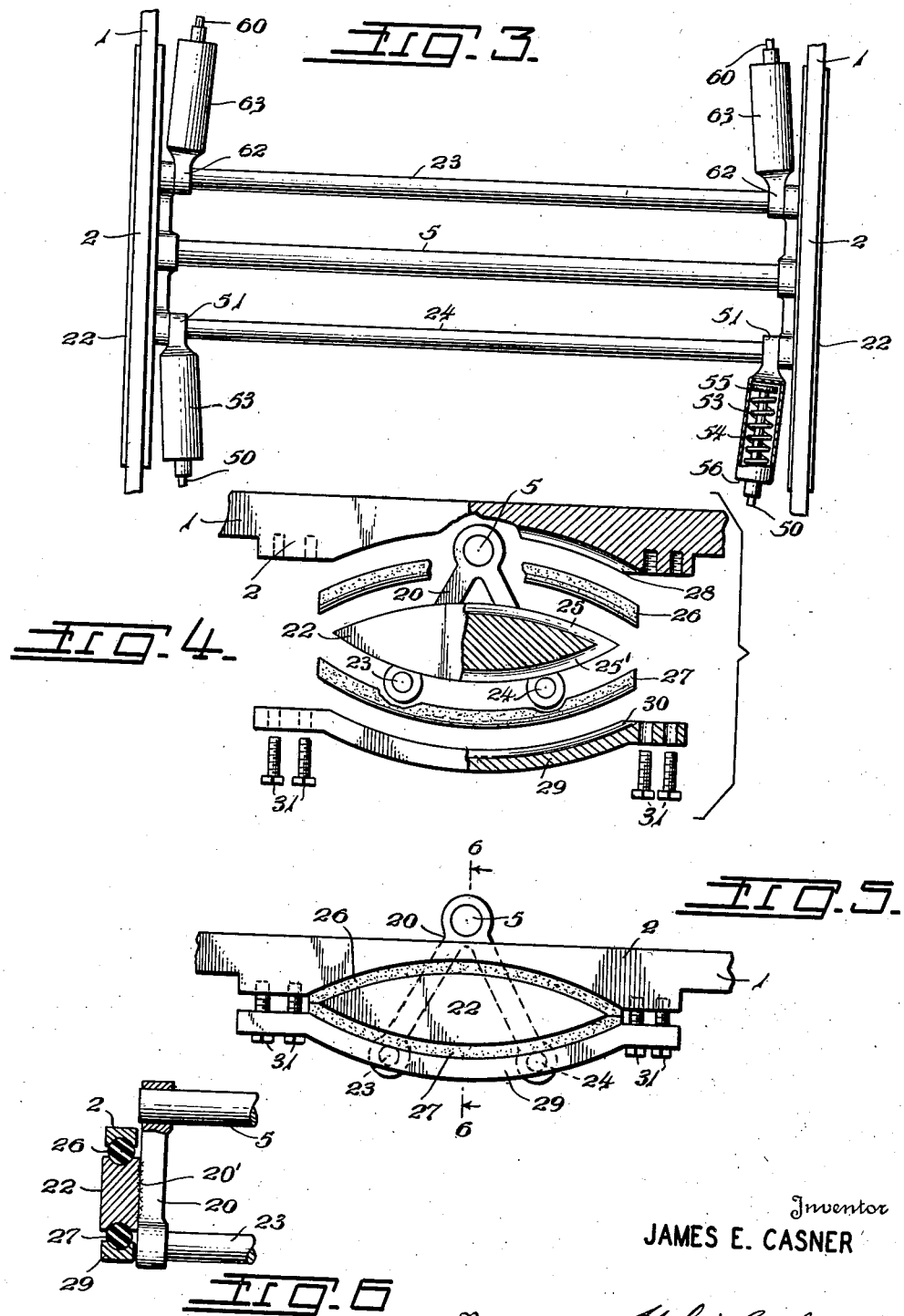
Inventor
JAMES E. CASNER
By H. G. Lombard
Attorney

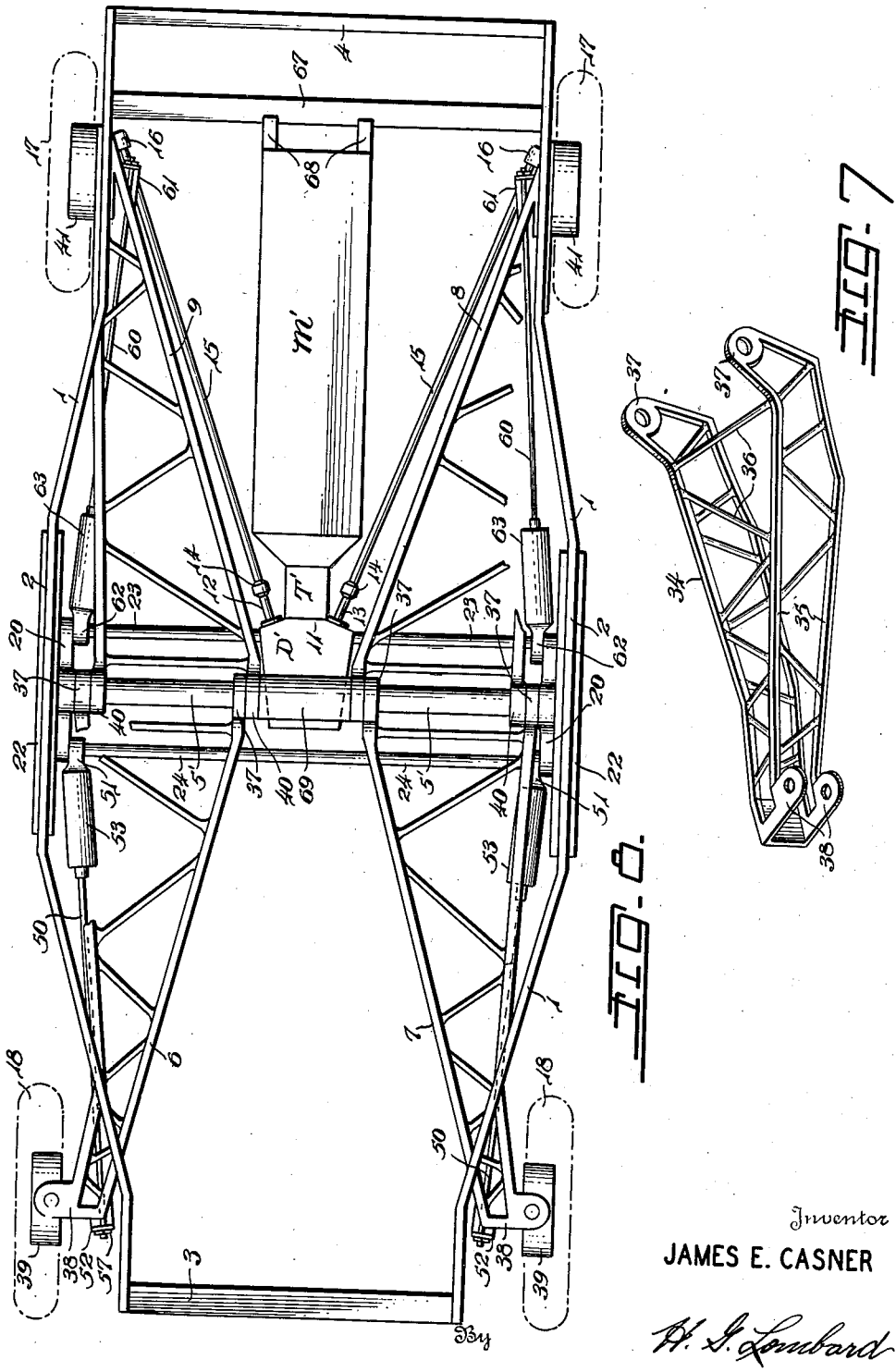

2,248,921

UNITED STATES PATENT OFFICE 2,248,921

AUTOMOBILE CHASSIS

James E. Casner, Alpine, Tex.

Application September 25, 1939, Serial No. 296,484

15 Claims. (Cl. 280—106.5)

This invention relates to improvements in suspension means for vehicles and deals, more particularly, with a combined shock absorbing and stabilizing structure for automobile chassis embodying an arrangement whereby each individual wheel is capable of independent movement to absorb the shock transmitted thereto incident to encountering obstructions and other inequalities or irregularities in road surfaces.

The invention, so far as it concerns independent suspension means for the wheels, is adapted for use in connection with all types of vehicles and is particularly suited for use with motor vehicles in providing a running gear so constructed that all road shocks will be absorbed or equalized thereby and otherwise prevented from being transmitted to the vehicle body. The frame of the vehicle is thereby held in an approximately balanced position at all times as the wheels accommodate themselves, as necessary, to any uneven or irregular surface in the road thus ensuring smooth, even riding qualities to the vehicle body and consequently, a maximum of comfort to the occupants thereof.

A primary object of the invention is to provide a wheel suspension arrangement in which each of the wheels is independently suspended from a common supporting medium such as a transverse horizontal main shaft disposed approximately centrally of the vehicle frame, whereby a highly practical, very simplified chassis construction is provided at a relatively low cost of manufacture.

Another principal object of the invention is to provide such a wheel suspension arrangement together with individual shock absorbing means whereby the shock transmitted to any wheel incident to encountering an obstruction or irregularity in the road, is distributed more or less entirely across the chassis and is absorbed and equalized in the running gear and thereby prevented from being imparted to a vehicle body and the various parts attached thereto. The car body is thereby capable of maintaining an approximately even keel in which the frame is disposed on a generally horizontal plane with practically all stresses and strains incident to riding conditions eliminated from the body, fenders, running boards, radiator and hood, etc., thus prolonging the life of these members and eliminating the squeaks, rattles and other objectionable noises common to these units.

Still another object of the invention is for the provision of an independent wheel suspension construction of this character including means for mounting the vehicle body onto the running gear by simplified connecting arrangement in which the vehicle body or frame is supported at only two spaced bearing areas and yet is maintained at all times on a generally even keel in the event any of the individual suspended wheels encounters and rolls over an obstruction or enters into and passes out of depression in a road surface. In this respect, the invention contemplates further the provision of sound insulating or buffer means in the mounting of the vehicle body in a manner to prevent many objectionable noises and annoying sounds arising in the running gear from being transmitted to the frame and the vehicle body carried thereby.

A still further object of the invention is to provide an independent wheel suspension arrangement for automobile vehicles which is admirably suited for use with either a forwardly or rearwardly mounted motor, as desired, and which wheel suspension arrangement together with the improved mounting means for the vehicle frame provides for maximum comfort and smooth even riding qualities of the car body, especially for occupants in the rear of a vehicle having a forwardly mounted motor, and for front seat passengers in the event the vehicle has a rearwardly mounted motor.

Still another object is to provide an independent wheel suspension construction of the kind described together with an improved body mounting means by which the major portion of the weight of the vehicle body is concentrated at or near a central point between the four wheels and a relatively low center of gravity is obtained making for increased safety in the operation of the vehicle.

Further objects and advantages, and other new and useful features in the construction, arrangement and general combination of the parts of the invention will be readily apparent to those skilled in the art as a description thereof proceeds with reference to the accompanying drawings in which like reference characters designate like parts throughout the same, and in which:

Fig. 1 is a top plan view of the chassis of an automobile vehicle showing the general arrangement of the essential members forming the undercarriage, parts being broken away to illustrate certain details of construction;

Fig. 2 is a side elevation of Fig. 1;

Fig. 3 is a close-up, fragmentary top plan view of the mid-portion of the chassis showing the mounting of the individual shock absorbing means for the independent wheel suspension units;

Fig. 4 is an exploded view showing generally the parts connected in mounting the vehicle frame to the undercarriage;

Fig. 5 is a side elevational view of a completed body mounting construction embodying the connected parts of Fig. 4;

Fig. 6 is a sectional view taken on line 6—6 of Fig. 5, looking in the direction of the arrows;

Fig. 7 is a perspective showing the general construction of a lever arm employed in one of the wheel suspension units; and, Fig. 8 is a view similar to Fig. 1 showing the general chassis construction of the present invention as adapted for use in an automotive vehicle having a rearwardly mounted motor.

Referring now, more particularly to the drawings, the numeral 1, Figs. 1 and 2, designates generally the longitudinal side beams or rails which together with cross members 3, 4, form the frame for supporting the body of the automobile or other vehicle. Substantially centrally between the ends of the frame is a transversely disposed horizontal main shaft 5 by which the front wheel suspension units 6, 7 and substantially similar rear wheel suspension units 8, 9 are mounted in the general chassis organization, as hereinafter more fully set forth.

As best seen in Fig. 1 a forwardly mounted motor M including the transmission generally designated T, is carried at one end by the forward cross frame member 3 and its opposite end by a suitable support comprising a sleeve 10, or the like, attached to the horizontal main shaft 5. As shown, the differential mechanism D is carried in a casing 11, disposed slightly rearwardly of said main shaft 5 in close proximity to the transverse median of the chassis and is preferably of a type which is built in with transmission casing together with a suitable partition to divide the volume of grease.

A pair of stub shafts 12, 13, extend from the differential casing 11 to universal couplings 14 connected to a pair of opposite outwardly inclined shafts 15 extending into gear cases 16, containing a part of the gearing for driving the rear wheels 17, as presently to be described. The front wheels, Figs. 1 and 2, are designated generally 18.

The transverse main shaft 5 is journalled at either end to a pair of substantially triangular hanger units 20 provided with bearing openings in triangularly spaced relation for mounting the auxiliary horizontal shafts 23, 24, Fig. 3. The triangular hanger units 20 are thus adapted to be disposed in transverse spaced relation as shown in Fig. 1, and on the outer face of each substantial brackets or mounting plates 22 are bolted or otherwise secured thereto, as by welding 20', Fig. 6. Said brackets or mounting plates 22 are of generally elliptical shape, as best seen in Fig. 4, with the longitudinal edges thereof provided with suitable grooves 25, 25', for receiving sections of rubber 26, 27 respectively, or similar insulating or sound deadening means.

The adjacent substantial center bearing area 2 of each side rail 1 of the frame is suitably formed to be rigidly supported by said mounting plates 22, Fig. 5, and each is provided with a similar groove 28, Fig. 4, on its lower face adapted to seat the rubber section 26 in a manner whereby the opposed surfaces of the frame bearing area 2 and mounting plate 22 are maintained in suitable spaced relation as shown in Figs. 5 and 6, thereby eliminating any metal to metal contact in the mounting of the frame to the running gear structure. A clamping head 29 having the general contour of the lower surface of the mounting plate 22 is provided with a groove 30, Fig. 4, seating the rubber section 27, Fig. 6, and otherwise includes apertured end-flanges receiving bolts 31, which are secured to the adjacent underside of the frame 1, as shown in Fig. 5, to clamp the essential bearing area 2 of the frame to the mounting plate 22 in completing the mounting of the frame to the undercarriage. Thus it will be appreciated that through the use of the rubber buffer strips 26, 27, or similar sound insulating means in the body mounting assembly, there is eliminated any metal to metal contact of the members secured which would permit objectionable noises and annoying sounds from the running gear to be transmitted to the vehicle body. It will be appreciated further that the securing means for the mounting is relatively simple in that the vehicle body or frame need be bolted to the underchassis, as shown in Fig. 5, at only two spaced bearing areas 2, on either side of the frame, this, of course, making for speed and economy in manufacture, especially from the standpoint of present day methods of mass production.

As best seen in Fig. 1, the mounting of the vehicle wheels is provided, as stated, by individual suspension units 6, 7 for the front wheels 18, and 8, 9, for the rear wheels 17, all pivoted to the main transverse shaft 5. Each of such suspension units embodies a substantial lever arm member which preferably is provided as shown in Fig. 7, for example, in the manner of a lattice girder, or the like, comprising suitably formed skeleton side sections 34, 35, maintained in spaced relation by reinforcing ribs or braces 36, as necessary.

The inner end portions of said side sections 34, 35 are suitably formed to provide substantial bearing necks 37, having rubber or metal bushings, but preferably rubber bushings in order to dispense with lubrication requirements. By means of such bearing necks 37, the arm member is pivotally mounted to the main transverse shaft 5 as shown in Figs. 1 and 2 to operate in the manner of a substantial lever suspension for the wheel carried thereby. The lever arm illustrated in Fig. 7 is the substantial construction of that employed in the front wheel suspension unit 7 in Figs. 1 and 2 and, in this respect, is provided at its outer end with bearing ears 38 for pivotally mounting the housing 39 for the wheel axle, brake assembly and related parts. The lever arm comprising the opposite front wheel suspension unit 6, shown in Fig. 1, is of the same general construction and is provided with similar means for mounting the front wheel associated therewith.

The lever arms for the rear wheel suspension units 8, 9, Fig. 1, are also provided in the manner of the substantial lattice girder arrangement of Fig. 7 and include similar bearing necks 40 by which such arm members may also be pivotally mounted to the main transverse shaft 5 in the general cooperative relation shown in Fig. 1. Fixedly mounted at the outer ends of said rear wheel lever arms 8, 9, are the housings 41, for the axles and brake assemblies of the rear wheels 17.

The shock absorbing means for the independent wheel suspension units thus provided are substantially identical, each comprising what may be termed a spring pull rod member exerting a continuous spring tension on the forward end of the lever arm to which it is connected. Thus, as shown in Figs. 1 and 3, each of the front wheel suspension units 6, 7, includes a rod 50 secured to the forward extremity of the associated lever arm by bracket 52 and connected at its opposite end to the auxiliary transverse shaft 24 by means of a spring hanger or casing 53 pivotally mounted on said shaft 24 through bearing ears 51 provided with suitable rubber or metal bushings. A coil spring 54 is disposed in said casing 53, as shown, and has passing therethrough an end portion of the rod 50 which is provided with a head element 55 adapted to bear upon said spring 54 and compress the same against the end wall 56 of the casing when an axial force is exerted on the rod 50. The forward end of said rod mounted to the lever arm by the bracket 52, Fig. 1, is provided with a screw threaded extremity carrying a nut 57 for purposes of adjusting the axial pull or tension exerted by the coil spring 54 acting through said head element 55 on the rod. As shown in Fig. 2, each rod 50 extends in generally upwardly inclined relation from its connection with transverse shaft 24 to the upper part of the forward end of its associated lever arm, the same passing diagonally through the open lattice girder construction, as illustrated in Fig. 1.

Likewise, the rear wheel suspension units 8, 9, are provided with substantially identical spring pull rod means wherein the rods 60 are connected to the forward ends of their respective lever arms by brackets 61 and to transverse horizontal shaft 23, Fig. 3, through bearing ears 62 on the spring hangers or casings 63. It is quite obvious that other forms of resilient means for the spring pull rods may be devised such as cylinders containing oil or a combination of oil and springs, without departing from the spirit of the invention disclosed.

From the foregoing, it will be appreciated that since each of the wheel suspension units embodies a separate pivotal mounting of the lever arm thereof on the main transverse shaft 5, the major portion of the weight of the car body is necessarily concentrated in the approximate center area covered by the running gear in a manner whereby the vehicle frame is readily maintained in an approximately balanced position at all times as the individually suspended wheels accommodate themselves, as necessary, to any uneven or irregular surface in the road. In this respect, the spring pull rod device embodied in each wheel suspension unit, as aforesaid, serves as a means more or less confining any resultant shock to the running gear and otherwise preserving the normal balanced position of the vehicle frame, thereby ensuring the utmost in smooth, even riding qualities to the car body. In other words, it will be understood that each independent wheel suspension unit is provided with an individual spring pull rod mounting, the general action of which is to gradually resist the movement of a wheel into a road depression or over a hump and thereby effectively absorb the resultant shock and otherwise prevent the same from being transmitted to the vehicle frame.

To this end, it will be also recognized that the cushioning action of a spring pull rod takes place, more particularly, substantially lengthwise of the lever arm with which it is associated, and therefore generally lengthwise of the vehicle frame. Further, since the spring pull rods are mounted at their inner ends to the transverse auxiliary shafts 23, 24, respectively, the force of any shock is taken up thereby in a plane extending generally parallel to the vehicle frame, and, of course, below the car body carried thereby, as will be understood from Fig. 2. Hence, all shock is practically confined to the running gear and since the same takes place in a longitudinal direction with respect to the vehicle frame, very little shock, if any, is transmitted to the car body mounted thereon.

One of the salient features of the present invention resides in the fact that the lever arm of any wheel suspension unit has a relatively long radius of lever movement, with the spring means of the pull rod associated therewith arranged in close proximity to the fulcrum or weight carrying end of such lever pivoted to the transverse main shaft 5. Accordingly, a relatively large leverage of the lever arm against the resistance of the spring means on the pull rod takes place and this, of course, permits extensive vertical movement of the wheel carrying end of the lever arm with a relatively short travel of the spring 54. Thus, in the case of a severe shock as when a wheel passes over a decided bump or enters a deep depression in the road, the resultant movement of the car body, if any, is relatively little and slow compared to the necessary spring of the wheel in accommodating itself to such a bump or depression.

Fig. 8 shows the general overall chassis construction including the frame mounting means and wheel suspension arrangement already described with reference to Fig. 1, and illustrates further, the manner in which the chassis of the present invention is equally adaptable to use with a rearwardly mounted motor arrangement requiring only a slight change in the disposition of the transmission, differential and the related mechanism for driving either front or rear wheels. In the embodiment shown, a separate support 67 is provided on the frame together with brackets 68 securing the motor M' thereto at its outer end. The opposite end of the motor associated with the transmission T', and differential housing D', is mounted to the transverse main shaft 5' by a sleeve or strap hanger 69, or the like, in any suitable manner. The structure of Fig. 8 otherwise is substantially similar to that shown in Fig. 1 with like reference characters designating the like parts thereof.

In a copending divisional application Serial Number 337,727, filed May 28, 1940, and since issued as United States Patent Number 2,242,605, May 20, 1941, there is disclosed an improved form of differential gearing which is admirably suited for use with the chassis construction of the present invention. This differential gearing preferably is of a type which may be housed within the casing 11, Fig. 1, in operative relation to the transmission T in providing the required differential and power connection from the motor to the stub shafts 12, 13, connected to the rear wheel drive shafts 15 through universal couplings 14.

While the invention has been described in detail with specific examples throughout, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by the United States Letters Patent is:

1. In a vehicle chassis, a frame, a substantially centrally positioned frame mounting unit comprising a plurality of transverse shafts, one of said shafts being a main transverse shaft and another an auxiliary shaft, hanger members supporting said shafts in horizontal spaced relation, running gear comprising independent wheel suspension units each having a pivotal connection with said main transverse shaft and means associated with said auxiliary shaft resisting movement thereof from normal position, and means carried by said hanger members supporting said frame in operative relation to said running gear.

2. In a vehicle chassis, a frame having side and cross members, a substantially centrally positioned frame mounting unit comprising a plurality of transverse shafts, one of said shafts being a main transverse shaft and another an auxiliary shaft, hanger members supporting said shafts in horizontal spaced relation, running gear comprising independent wheel suspension units each having a pivotal connection with said main transverse shaft and means associated with said auxiliary shaft resisting movement thereof from normal position, and substantial mounting plates carried by said hanger members, said mounting plates extending lengthwise of the vehicle frame and supporting said side members of the frame to maintain said frame in operative relation to said running gear.

3. In a vehicle chassis, a frame, a substantially centrally positioned frame mounting unit comprising a plurality of transverse shafts, one of said shafts being a main shaft and another an auxiliary shaft, hanger members supporting said shafts in horizontal spaced relation, running gear comprising independent wheel suspension units each having pivotal connection with said main transverse shaft, and resilient means supported by the auxiliary shaft and associated with each wheel suspension unit maintaining the same in normal position with respect to said frame and resisting movement of said wheel suspension unit from such normal position.

4. In a vehicle chassis, a frame having side and cross members, a substantially centrally positioned frame mounting unit comprising a plurality of transverse shafts, one of said shafts being a main shaft and another an auxiliary shaft, hanger members supporting said shafts in horizontal spaced relation, independent wheel suspension units each having pivotal connection with said main transverse shaft, substantial mounting plates carried by said hanger members extending lengthwise of the vehicle frame and supporting said side members of the frame, and resilient means supported by the auxiliary shaft and associated with each wheel suspension unit maintaining the same in normal position with respect to said frame and resisting movement of said wheel suspension unit from such normal position.

5. In a vehicle chassis, a frame, a substantially centrally positioned frame mounting unit comprising a plurality of transverse shafts, one of said shafts being a main transverse shaft and another an axuiliary shaft, hanger members supporting said shafts in horizontal spaced relation, running gear comprising independent wheel suspension units each having pivotal connection with said main transverse shaft, a spring pull rod embodied in each wheel suspension unit, said spring pull rod being secured at one end to its associated wheel suspension unit and at its opposite end by means connected with said auxiliary shaft.

6. In a vehicle chassis, a frame having side and cross members, a substantially centrally positioned frame mounting unit comprising a plurality of transverse shafts, one of said shafts being a main transverse shaft and another an auxiliary shaft, hanger members supporting said shafts in horizontal spaced relation, independent wheel suspension units each having a pivotal connection with said main transverse shaft, substantial mounting plates carried by said hanger members, said mounting plates supporting said side members of the frame to maintain said frame in operative relation to said running gear, and a spring pull rod embodied in each wheel suspension unit, said spring pull rod being secured at one end to its associated wheel suspension unit and at its opposite end by means connected with said auxiliary shaft.

7. In a vehicle chassis, a frame, running gear associated with said frame, means mounting said frame in operative relation to the vehicle running gear comprising a main transverse shaft substantially centrally of said frame, said running gear comprising independent wheel suspension units each including a substantial lever arm, said lever arm comprising a substantial lattice girder structure provided with spaced bearing necks having pivotal connections with said main transverse shaft.

8. In a vehicle chassis, a frame, running gear associated with said frame, means mounting said frame in operative relation to the vehicle running gear comprising a main transverse shaft substantially centrally of said frame, a supporting member associated with said shaft, said running gear comprising independent wheel suspension units each of which includes a substantial lever arm having a pivotal connection with said main transverse shaft, and a stabilizer associated with each of said lever arms comprising a spring mounted rod attached at one end to its associated lever arm and connected with said supporting member associated with said main transverse shaft to resist the movement of said lever arm from its normal position.

9. In a vehicle chassis, a frame, running gear associated with said frame, means mounting said frame in operative relation to the vehicle running gear comprising a main transverse shaft substantially centrally of said frame, said running gear comprising independent wheel suspension units each of which includes a substantial lever arm having a pivotal connection with said main transverse shaft, and a stabilizer associated with each of said lever arms, said stabilizer comprising a spring mounted pull rod attached to the forward end of the lever arm and connected to means associated with said main transverse shaft for resisting the movement of said lever arm from its normal position.

10. In a vehicle chassis, a frame, a main transverse shaft substantially centrally of said frame, independent wheel suspension units each comprising a substantial lever arm having a pivotal connection with said main transverse shaft, substantial hanger members depending from said main transverse shaft, an auxiliary transverse shaft carried by said hanger members below said main transverse shaft, a spring pull rod embodied in each wheel suspension unit, said spring pull rod being secured at one end to the lever arm associated therewith and at its opposite end by means connected with said auxiliary transverse shaft.

11. In a vehicle chassis, a frame, a main transverse shaft substantially centrally of said frame, running gear comprising independent wheel suspension units each embodying a substantial lever arm having a pivotal connection with said main transverse shaft, substantial hanger members at either end of said main shaft, an auxiliary transverse shaft carried by said hanger members below said main transverse shaft, a spring pull rod embodied in each wheel suspension unit, said spring pull rod being secured at one end to the lever arm associated therewith and at its opposite end by means connected with said auxiliary transverse shaft, said means comprising a casing having a pivotal connection on said auxiliary transverse shaft and housing a coil spring exerting an axial force on said pull rod.

12. In a vehicle chassis, a frame, a main transverse shaft substantially centrally of said frame, independent front and rear wheel suspension units each comprising a substantial lever arm having a pivotal connection with said main transverse shaft, substantial hanger members depending from said main transverse shaft, auxiliary transverse shafts carried by said hanger members in spaced relation below said main transverse shaft, a spring pull rod embodied in each wheel suspension unit, said spring pull rod being secured at one end to the lever arm associated therewith and at its opposite end by means connected with the auxiliary transverse shaft nearest thereto.

13. In a vehicle chassis, a frame having side and cross members, running gear associated with said frame, a main transverse shaft substantially centrally of said frame, substantial hanger members depending from said main transverse shaft, mounting plates on said hanger members designed to support said side members of the frame, buffer means between the adjacent surfaces of the mounting plates and frame side members, and means for securing said frame side members to the mounting plates with said buffer means disposed therebetween.

14. In a vehicle chassis, a frame having side and cross members, running gear associated with said frame, a main transverse shaft substantially centrally of said frame, substantial hanger members depending from said main transverse shaft, mounting plates on said hanger members designed to support the frame side members, each mounting plate having a groove in its supporting surface, sound insulating means in said groove adapted to maintain the adjacent surfaces of the frame and mounting plate in spaced relation, and means for securing the frame side members to said mounting plates.

15. In a vehicle chassis, a frame having side and cross members, running gear associated with said frame, a main transverse shaft substantially centrally of said frame, substantial hanger members at either end of said main transverse shaft, mounting plates on said hanger members designed to support the frame side members, said mounting plates having grooves on their peripheral surfaces, sound insulating means in said grooves adapted to maintain the adjacent surfaces of the members secured in spaced relation, and means for securing the frame in mounted position comprising substantial clamping heads bolted to said frame side sections in clamping relation with said mounting plates.

JAMES E. CASNER.